June 12, 1956 H. W. STIEGLER 2,749,740
APPARATUS FOR TESTING FABRIC
Filed Sept. 14, 1950 2 Sheets-Sheet 1
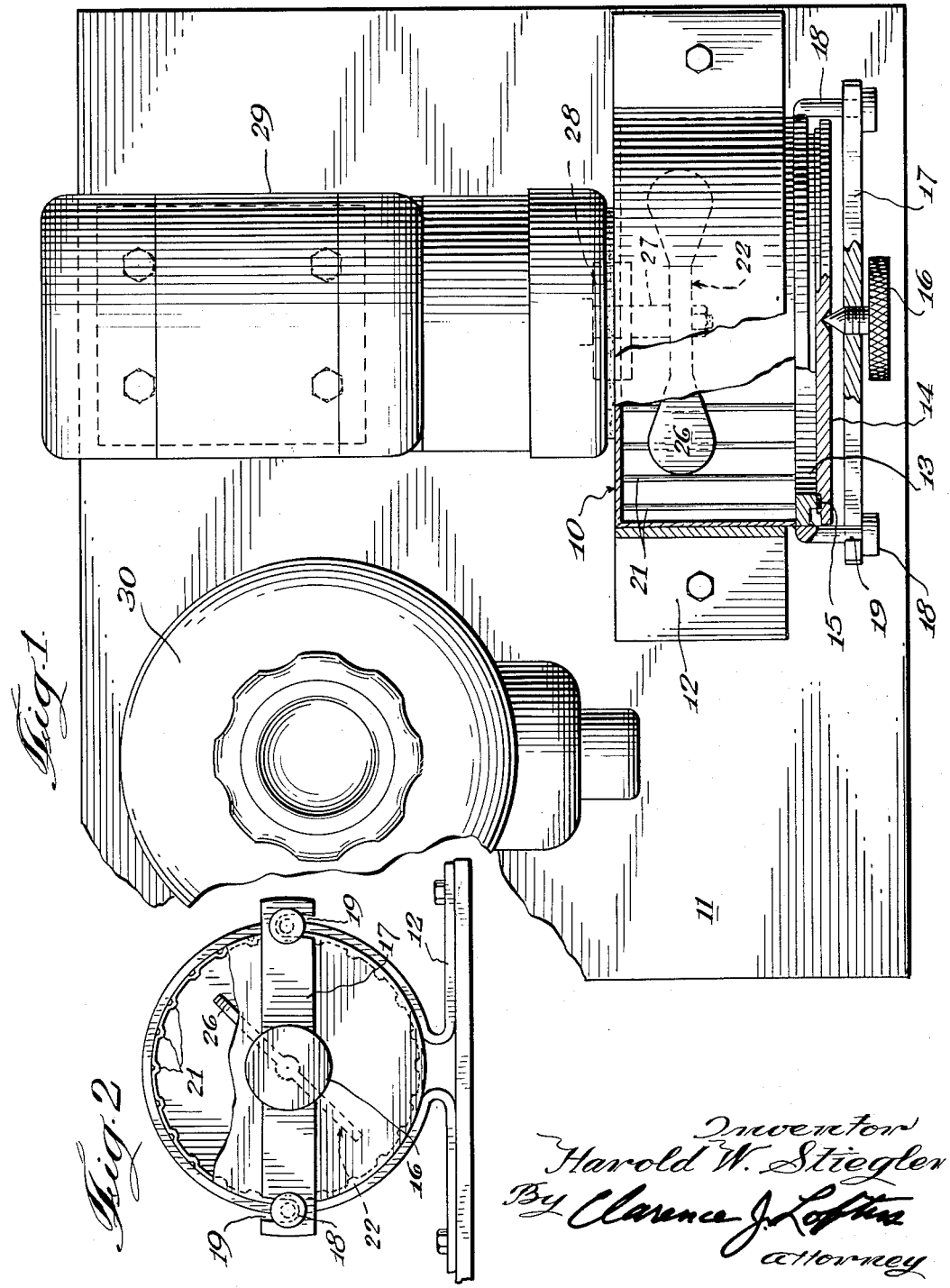
Inventor
Harold W. Stiegler
By Clarence J. Loftus
Attorney June 12, 1956     H. W. STIEGLER     2,749,740
APPARATUS FOR TESTING FABRIC
Filed Sept. 14, 1950     2 Sheets-Sheet 2
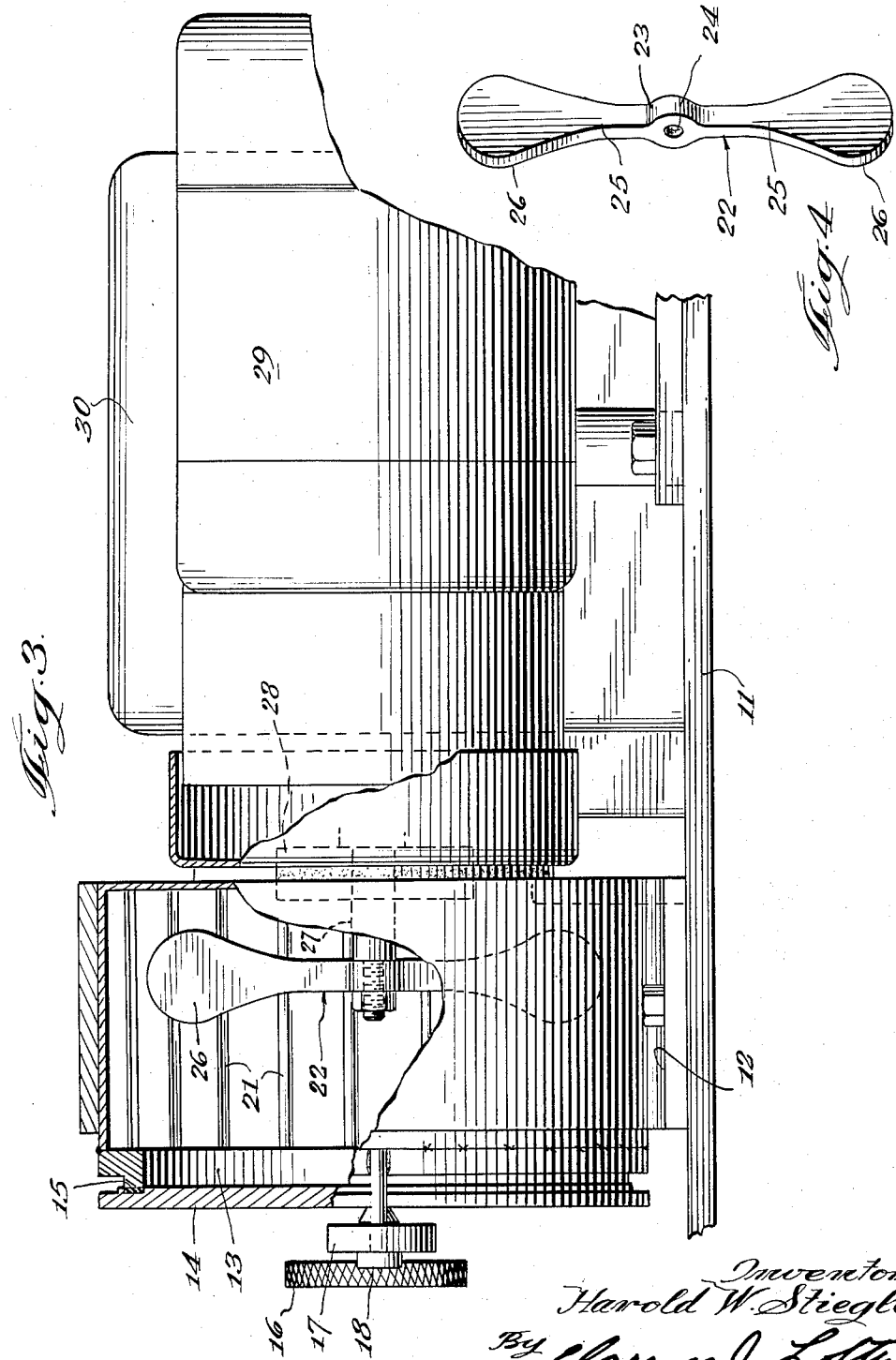
Inventor
Harold W. Stiegler
By Clarence J. Loftus
Attorneys

United States Patent Office 2,749,740
Patented June 12, 1956

2,749,740
APPARATUS FOR TESTING FABRIC

Harold W. Stiegler, Lowell, Mass.

Application September 14, 1950, Serial No. 184,833

2 Claims. (Cl. 73—7)

This invention relates to a new and improved apparatus for testing textile and other flexible materials for colorfastness, strength, wear, weight loss, shrinkage, porosity, etc., and particularly to apparatus capable of making the test under laboratory conditions and in an unusually short time interval; yet faithfully duplicating the effects of actual wear, laundering, and use.

The determination of the above mentioned characteristics of fabrics and other flexible materials under actual conditions presents a serious problem because of the time interval involved. Manufacturers and sellers of garments, for example, have difficulty in following specific garments through the channels of trade to specific individual users or consumers. Even if they can identify such users, it is a matter of many months before the garment has been sufficiently worn or used to serve as any kind of guide as to the effect of the wear and use on the colorfastness, weight, porosity, etc., of the garment. Furthermore, it is exceedingly difficult to determine from the consumer or user, the extent of the wear and use with sufficient definiteness to be instructive to the manufacturer, and even if such a determination is accurately made, it is of little value unless made promptly, so that any defects may be remedied while the given material is still in process of manufacture and before it reaches the market.

From the foregoing, it can be appreciated that a laboratory apparatus for testing of fabrics and other flexible materials, in a very short interval of time, is of extreme importance to the manufacturer or seller of such goods. Yet to be of value, any such test must be accurate. That is, it must give a true indication of the wearing qualities of the material in the end use for which it is intended.

Similarly, while a textile manufacturer who wishes to maintain control of his product with respect to colorfastness, shrinkage, etc. in laundering may send samples of cloth in process to commercial laundries for a great number of successive launderings, this may consume several weeks in time. Even so, such a test is not entirely satisfactory since it does not show the effect of wear and use.

In the ordinary use of fabrics and other materials, including wear, laundering, dry-cleaning, etc., abrasion is a principal factor affecting color, strength, weight, porosity, shrinkage, etc. Consequently, up to the present time, practically all synthetic methods of testing and evaluating wearing qualities of fabrics, or other flexible materials, have involved the rubbing, scraping, or abrading of the material, or otherwise applying surface friction to the material, while it is firmly fixed and held and not free to move or flex appreciably. Usually the material is held fast in a fixed position, and moved in relation to the abrasive material. It has long been known, however, that while such methods may give some indication of the wearing qualities of the material tested, yet they do not accurately duplicate the effects of actual use of the material or garments as a whole. This is particularly true with garments, where the conditions encountered in actual use involve not only wear but continuous and frequent laundering, dry-cleaning, and the like. Thus in the textile trade and in other trades using cloth, leather or other flexible fibrous materials, there has long been a recognized need of means to determine accurately, under laboratory conditions, the inherent capacity of fabrics or other flexible materials to withstand ordinary wear and abrasion, and to accurately determine, from a small swatch or other sample of a given material, its ability to retain its color, strength, weight, and porosity, and its ability to resist shrinkage. A further aspect of the long-existing problem which has heretofore defied successful solution is to determine, within a few minutes, the cleansing effect on particular textile materials of different soaps and detergents.

It is, therefore, the primary object of the present invention to provide an apparatus for testing such materials in an extremely short time, yet capable of providing an accurate determination of the characteristics of the material under actual conditions of wear and use.

A further object of the invention is to provide an apparatus in which fabrics or other flexible materials may be tested in a dry state for the effects of wear and abrasion on color, weight, strength, porosity, etc., and also in which such materials may also be tested wet—that is, moist, dripping wet, or in water, in a soap solution, or in a solution of dyes, finishing materials, solvents, liquids, chemicals, etc., to determine the effects of repeated laundering, degree of permeability to dyes, or other characteristics.

A further object of the invention is to provide a means whereby fabrics or other materials may be tested for the effects of abrasion and wear under a great variety of conditions such as temperature, in high or low soap concentration, in cleaning liquids, etc.

Another object of the invention is to provide apparatus for making such tests on such materials which is simple in construction, economical to manufacture and maintain, is free of complicated parts which might easily get out of order, and is simple and easy to operate.

In accomplishing these objects, the present applicant has departed from the teachings of the prior art, which ordinarily have sought to duplicate, as closely as possible, the conditions encountered in actual use. In contrast to this, the present applicant has devised a testing method wherein the test sample is subject to conditions entirely different from those encountered in normal use, but which nevertheless have been found to result in a more accurate determination of the actual wear-resisting qualities of a given material than has heretofore been accomplished.

In ordinary usage, textile materials are subjected to the flexing and abrasive effects of ponderous forces applied to the material at comparatively low speeds, and in most cases these forces are applied to the material while it is held in such a manner that it is not free to move or shift about appreciably.

In the test here disclosed, the test samples are not secured nor restrained in any manner, but are carried in a free floating condition (which may be either in liquid or in air) and are driven in a random path of movement such that they repeatedly impinge the walls of a container in which the test is conducted, and are caused to follow a zig-zag course along a generally circular orbit, while at the same time being continuously subjected to rapidly repeated light, high-velocity mechanical impacts. By this mode of treatment the test samples of the material are simultaneously subjected to external abrasion and internal friction which may involve the rubbing of fiber against fiber or thread against thread, as well as frictional contact and impact between the surfaces of the samples. These effects are accomplished, moreover, without the tensile strains that are necessarily imposed on test samples abraded when so firmly fixed that they are not free to move about.

In the preferred form of the invention, the test samples are treated in the manner indicated above by an apparatus best described in connection with the drawings of this specification, wherein:

Figure 1 is a plan view partially in section of a test apparatus specifically designed to practice the test here disclosed;

Figure 2 is an end elevational view, partly in section, showing one end of the test chamber disclosed in Figure 1;

Figure 3 is a side elevational view, partly in section, showing said test chamber; and Figure 4 is a perspective view of a typical form of rotary impeller employed in the testing apparatus.

The apparatus comprises in general a test chamber 10 which, in the form of the invention illustrated, is a relatively small, cup shaped can or cylinder secured on a mounting base 11 by the curved clamping strip or bracket 12. The chamber 10 is of generally cylindrical form, having its open mouth 13 provided with a circular cover plate 14 sealed by a gasket 15 and held in position by a thumb screw 16 carried on a cross bar 17 anchored on a pair of headed studs 18 by notches 19 (Figure 2) in the cross bar. If desired, the chamber 10 may be provided with a multiplicity of internal ribs or projections 21. In any event, it is provided with a rotary impeller 22 (Figure 4) which, in the form shown, has a hub 23 in which a bore 24 is formed to receive the motor shaft, and is provided with two oppositely disposed arms 25 of similar shape and terminating in enlarged flat paddle portions 26, lying in substantially the same plane as shown in Figure 4 and each disposed at an angle with respect to the axis of the motor shaft and arranged to alternately strike a fabric within the chamber. This impeller is mounted on a rotary shaft 27 which extends through a fluid seal 28 in the center of the end wall of the housing 10, and is coupled to the armature shaft of a high speed driving motor 29. The motor is preferably capable of rotation at very high speeds (up to 15,000 R. P. M. or higher) but is provided with a voltage regulator 30 so that the speed can be precisely controlled.

In conducting a test with this apparatus, it is preferable that two or more test samples (which need be only small swatches of the material) are placed in the chamber 10. Water, soap solution, detergents or other chemicals may be added if desired. The cover is then placed in position and sealed by tightening the screw 16. The motor may then be started by manipulation of the voltage regulator 30, which is preferably set so that the impeller 22 moves with a unidirectional rotary motion, and at a known and constant speed of from 1,000 to 15,000 R. P. M., depending upon the material being tested. The impeller 22, and particularly the paddle portions 26 thereof, serve as means for driving the test samples of the material. The samples are thus driven in a random path of movement within the test chamber, where they repeatedly impinge the walls of the container and are deflected therefrom so that they carom around the sides and walls of the container in a zig-zag course, yet follow a generally circular orbit. At the same time, the samples are subjected to rapidly repeated, high-velocity impacts of the impeller and caused to bend and flex by contact with each other and with the chamber walls and the ribs thereon, which also effect abrasion on the surfaces of the samples.

It has been learned that by the use of this apparatus, it is possible to make an accurate determination of the wear-resisting qualities of a given material by a test concluded in a matter of minutes, yet accurately indicative of the changes which will occur as a result of many weeks of actual use, processing, laundering, dry cleaning and wearing of the material. It follows that the effects of wear and the resistance of the fabric to scuffing, scratching and abrasion may be determined in a much shorter period of time than possible by observation of actual use of the fabrics, and with a degree of accuracy never heretofore possible by synthetic testing methods. Similarly, color-fastness to laundering and abrasion may be determined in a few minutes. This is extremely important in commercial operations, since tests of material in process in a mill may be made periodically, and the results are available in time to permit immediate correction of processing details responsible for any deviation from normal. Such a result is obviously impossible by observation of the characteristics of the material in actual use or by test instruments of types heretofore devised, which require from one day to a week or more before the results of the test are known.

Having thus described my invention, what I claim as new and desire to secure by United States Letters Patent is:

1. A fabric testing apparatus for determining quality characteristics of fabrics and other flexible materials comprising, in combination a relatively small closed test chamber consisting of a generally cylindrical inner wall extending between a pair of spaced apart end walls with at least one of said walls moveable to afford access to said test chamber; an electric motor mounted adjacent said test chamber with a rotatable shaft driven by said motor extending through one of the aforementioned end walls into said test chamber, and means for driving a sample of material within said container in a random, zig-zag path of movement along a generally circular orbit and simultaneously causing it to repeatedly impinge the walls of said container and carom therefrom whereby said sample is subjected to both internal and external friction as it progresses; said means consisting of a rotary impeller having a hub portion centrally disposed on the axis of said container and at least one pair of flat paddles, each paddle extending from said hub to a point adjacent the cylindrical wall of the container and between the end walls thereof, the paddles of said pair being inclined to said hub and lying in substantially the same plane.

2. A fabric testing apparatus for determining quality characteristics of fabrics and other flexible materials comprising, in combination, a relatively small closed test chamber consisting of a generally cylindrical inner wall extending between a pair of spaced apart end walls with at least one of said walls moveable to afford access to said test chamber, said inner wall being irregular; an electric motor mounted adjacent said test chamber with a rotatable shaft driven by said motor extending through one of the aforementioned end walls into said test chamber, and means for driving a sample of material within said container in a random, zigzag path of movement along a generally circular orbit and simultaneously causing it to repeatedly impinge the walls of said container and carom therefrom whereby said sample is subjected to both internal and external friction as it progresses; said means consisting of a rotary impeller having a hub portion centrally disposed on the axis of said container and at least one pair of flat paddles, each paddle extending from said hub to a point adjacent the cylindrical wall of the container and between the end walls thereof, the paddles of said pair being inclined to said hub and lying in substantially the same plane.

References Cited in the file of this patent

UNITED STATES PATENTS

| | | |
|---|---|---|
| 496,770 | Blanchard | May 2, 1893 |
| 1,170,103 | Regnier | Feb. 1, 1916 |
| 1,190,516 | Clark | July 11, 1916 |
| 1,376,815 | Kalmanowitz | May 3, 1921 |
| 1,476,081 | Kavanaugh | Dec. 4, 1923 |
| 2,478,188 | Gibson | Aug. 9, 1949 |
| 2,519,556 | Fish | Aug. 22, 1950 |

FOREIGN PATENTS

| | | |
|---|---|---|
| 222,283 | Switzerland | July 15, 1942 |

OTHER REFERENCES

Journal of Research of the N. B. S., vol. 14, Jan. 1935; paper RP753.